United States Patent
Aiga et al.

(10) Patent No.: US 7,474,042 B2
(45) Date of Patent: Jan. 6, 2009

(54) MAGNETRON WITH GRAPHITE NANO-FIBERS ON CATHODE

(75) Inventors: Masayuki Aiga, Tochigi (JP); Toshiyuki Tsukada, Tochigi (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/912,099

(22) Filed: Aug. 6, 2004

(65) Prior Publication Data

US 2005/0029917 A1 Feb. 10, 2005

(30) Foreign Application Priority Data

Aug. 7, 2003 (JP) ............... P. 2003-288752

(51) Int. Cl.
*H01J 1/62* (2006.01)
(52) U.S. Cl. ..................... 313/310; 313/495
(58) Field of Classification Search ............ 313/310
See application file for complete search history.

(56) References Cited

U.S. PATENT DOCUMENTS

| | | | | |
|---|---|---|---|---|
| 2,803,773 | A | * | 8/1957 | Wilbur et al. ............ 313/157 |
| 5,317,006 | A | * | 5/1994 | Kumar ................... 204/298.12 |
| 6,717,340 | B2 | * | 4/2004 | Nishimura ............... 313/310 |
| 2002/0060516 | A1 | | 5/2002 | Kawate et al. |
| 2002/0125827 | A1 | * | 9/2002 | Mearini et al. ............ 315/39.75 |

FOREIGN PATENT DOCUMENTS

| | | |
|---|---|---|
| EP | 0 593 768 A1 | 4/1994 |
| EP | 1 225 613 A1 | 7/2002 |
| JP | 52-102667 | 8/1977 |
| JP | 2740793 | 1/1998 |
| JP | 2000-100339 | 4/2000 |
| JP | 2001-23531 | 1/2001 |
| JP | 2001-319560 | 11/2001 |
| JP | 2003-242898 | 8/2003 |
| WO | WO 03/046941 A1 | 6/2003 |

OTHER PUBLICATIONS

European Search Report, issued in European Patent Application No. 04018738.7-2208, dated on Feb. 5, 2008.
English translation of Japanese Office Action issued in Japanese Patent Application No. JP 2003-288752, mailed Jun. 13, 2008.

* cited by examiner

*Primary Examiner*—Joseph L Williams
(74) *Attorney, Agent, or Firm*—McDermott Will & Emery LLP

(57) ABSTRACT

A cathode substrate 10 is heated to 400 to 600° C. in the atmosphere of hydrocarbon gas such as methane and the gas is allowed to react with the surface of the cathode substrate 10 by a thermal CVD method. Thus, an electron emission source in which graphite nano-fibers 11 are allowed to grow in a gaseous-phase on the surface of the cathode substrate 10 by using nickel or iron existing on the surface of the cathode substrate 10 as a nucleus is held between upper and lower end hats 12 to form a cathode part 13.

5 Claims, 4 Drawing Sheets

BACKGROUND OF THE INVENTION

The present invention relates to a field emission type magnetron used for a high frequency heating device such as a microwave range or a pulse generator such as a radar.

In a usual thermo-electron emission type magnetron, a hot cathode is used as an electron source. The hot cathode supplies electrons by emitting thermo-electrons. A thermo-electron emission is a mechanism that free electrons of a conduction band of the cathode obtain thermal energy by heating a material at about 1500 to 2700 K so that the free electrons get over a surface potential barrier to be emitted to a space.

FIG. 6 is a longitudinally sectional view showing one example of a usual thermo-electron emission type magnetron. In the drawing, a hot cathode 2 is disposed at a central part of a plurality of anode vanes 1. The hot cathode 2 is formed in such a manner that tungsten wire rods 3 including thorium are formed helically at substantially equal intervals and both end parts are held by end hat parts 4. Electric current is supplied to the hot cathode 2 to raise the temperature of the cathode to about 2000K and emit thermo-electrons (for instance, see JP-A-2001-23531).

Further, a field emission type magnetron provided with a cathode that employs a usual field emission phenomenon uses a metallic foil as an electrode, as well known (for instance, see Japanese Patent No.2740793).

The field emission phenomenon means a phenomenon that a high electric field (about $10^9$ V/m) is applied to a part near the surface of a material to allow the potential barrier on the surface of the material to be thin and electrons to be emitted outside the material without getting over the potential barrier due to a tunnel effect generated by the surge characteristics of the electrons. In the case of the magnetron of a cm band in which the voltage of the cathode is located within a range of several kV to several ten kV, the field intensity of the surface of the cathode is $10^7$ V/m. Thus, when the electric field is not intensified approximately by two digits, the field emission is not generated. Accordingly, in order to realize the field emission in the cathode for the magnetron, an electrode for a field emission needs to have a structure that a radius of curvature of an end is small like a needle or a foil and improve a field concentration effect.

FIG. 7 is a longitudinally sectional view showing the structure of main parts of the usual field emission type magnetron. In the drawing, a cathode part 5 is disposed in a central part of a plurality of anode vanes 1. The cathode part 5 has a structure that a plurality of field emission electrodes 6 made of metallic thin films formed in disk shapes with edges sharpened by an electric corrosive method are combined with a plurality of cathode substrates 8 to which oxide films 7 are applied to have a high secondary electron gain and the combined members are held between end hats 9. The oxide films 7 of the cathode substrates 8 are arranged to emit many secondary electrons when electrons from the field emission electrodes 6 rush.

In the usual thermo-electron emission type magnetron, since the temperature of the cathode reaches about 2000K, an expensive material having a high melting point has needed to be used in the periphery of the cathode.

In the usual thermoelectron emission type magnetron, a heater power source for heating the cathode has been separately necessary as well as a high voltage power source for applying voltage between the anode and the cathode of the magnetron.

The usual thermoelectron emission type magnetron undesirably has a problem that it takes time to supply electric current to the cathode and obtain a desired operating temperature.

Further, the usual thermoelectron emission type magnetron inconveniently needs to raise the temperature of the cathode and the cathode undesirably consumes electric power.

Further, in the usual field emission type magnetron, a work for sharpening the edges of metallic foils as field emission electrodes has been difficult. Further, a stable production has been difficult.

Since field intensities applied to a plurality of field emission electrodes are respectively different, electric currents emitted from the electrodes are not respectively uniform. Therefore, the electrode to which a load is applied is especially seriously exhausted, so that the function of the electrode is firstly deteriorated. This phenomenon undesirably causes the life of the whole of the cathode to be shortened.

Since a large number of field emission electrodes as primary electron emission sources and electrodes as secondary electron emission sources for multiplying electrons emitted from an electric field needs to be coaxially arranged, the number of parts is undesirably large, an assembly thereof is difficult and a cost is high.

SUMMARY OF THE INVENTION

An object of the present invention is to provide a magnetron having a cathode part whose life can be lengthened with a simple structure.

In order to solve the above-described problems, a magnetron according to the present invention has an anode part and a cathode part disposed coaxially. Graphite nano-fibers are arranged on the electron emission surface of the cathode part.

The cathode part is provided with an oxide material film high in its secondary electron gain arranged in a part of the electron emission surface.

Further, the cathode part is preferably formed in the form of a circular post or in a cylindrical shape.

Further, the cathode part is preferably formed in the shape of a polygonal post or in a polygonal tubular shape.

In another magnetron according to the present invention, the mixture of oxide whose particle diameter is several microns to several ten microns and graphite nano-fibers as a powdered material is applied on the surface of a cathode substrate to obtain an electron emission source.

Further, a part of the electron emission source is preferably formed with filaments.

According to the present invention, such advantages as described below are realized.

The graphite nano-fibers or carbon fibers are used for the cathode part so that the operating temperature of the cathode is lowered. Thus, the peripheral part of the cathode can be formed with inexpensive metal such as stainless steel.

The graphite nano-fibers or carbon fibers are used for the cathode part so that a power source for heating the cathode is not required. Thus, a power source for the magnetron or the structure of the magnetron can be greatly simplified.

The graphite nano-fibers or carbon fibers are used for the cathode part so that the magnetron can perform an instantaneous operation after voltage is applied to the magnetron.

The graphite nano-fibers or carbon fibers are used for the cathode part so that the consumed electric power of the cathode becomes zero. Thus, energy can be greatly saved.

The graphite nano-fibers or carbon fibers are used for the cathode part so that a mass-production can be achieved in a stable manner by using various kinds of CVD methods.

The graphite nano-fibers or carbon fibers are used for the cathode part so that electron can be uniformly emitted from the entire part of a film. Thus, the life of the magnetron is lengthened.

DETAILED DESCRIPTION OF THE PREFERRED EMBODIMENTS

Figure 1:
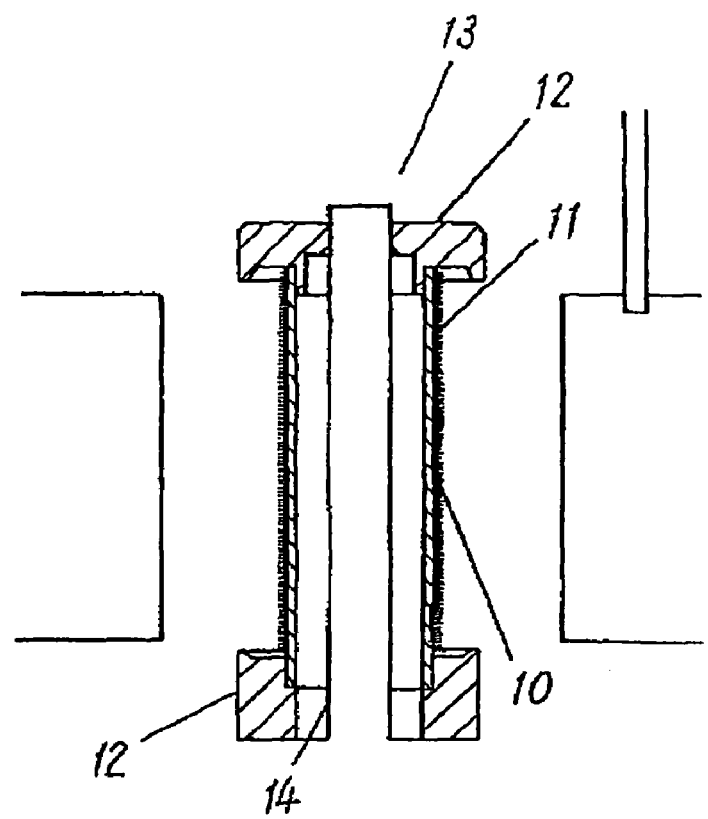
FIG. 1 is a longitudinally sectional view showing the structure of main parts of a magnetron having a cathode part with graphite nano-fibers formed on the surface of the cathode in a first embodiment of the present invention.

Now, an embodiment of a magnetron according to the present invention will be described by referring to the drawings.

First Embodiment

FIG. 1 is a longitudinally sectional view showing the structure of main parts of a magnetron having a cathode part with graphite nano-fibers formed on the surface of the cathode in a first embodiment of the present invention.

In this embodiment, a cathode substrate 10 is heated to 400 to 600° C. in the atmosphere of hydrocarbon gas such as methane and the gas is allowed to react with the surface of the cathode substrate 10 by a thermal CVD method. Thus, an electron emission source in which graphite nano-fibers 11 are allowed to grow in a gaseous-phase on the surface of the cathode substrate 10 by using nickel or iron existing on the surface of the cathode substrate 10 as a nucleus is held between upper and lower end hats 12 to form a cylindrical cathode part 13.

Figure 6:
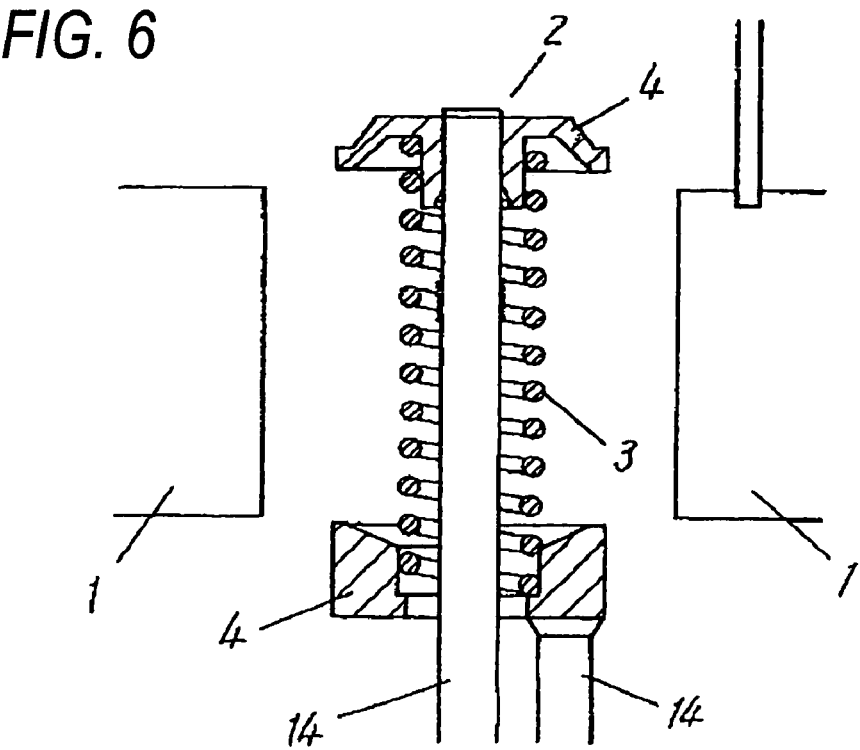
FIG. 6 is a longitudinally sectional view showing the structure of main parts of a usual thermoelectron emission type magnetron.
Figure 7:
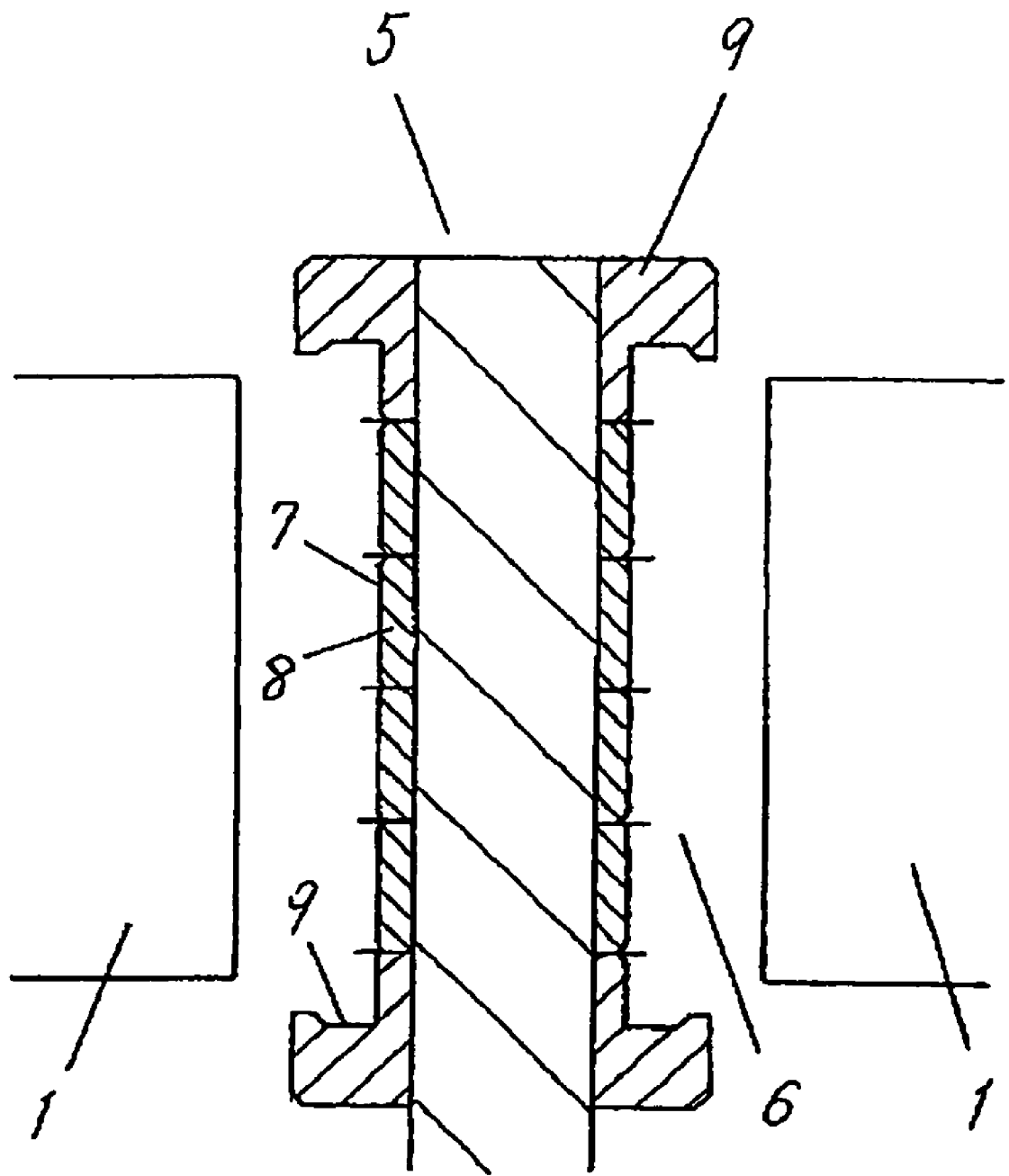
FIG. 7 is a longitudinally sectional view showing the structure of main parts of a usual field emission type magnetron.

Since a current path for heating the cathode is not necessary, one connecting terminal 14 is required as compared with two usual hot cathodes as shown in FIG. 6.

The graphite nano-fibers are employed as the electron emission source, so that a field concentration effect can be improved owing to the form thereof. Accordingly, ordinarily used voltage (several kV to several ten kV) is applied to the surface of the cathode part to easily obtain a strong electric filed ($10^9$V/m). Thus, a potential barrier on the surface of the cathode becomes thin to generate a tunnel effect due to the surge characteristics of electrons and emit the electrons to a space without heating.

Second Embodiment

Figure 2:
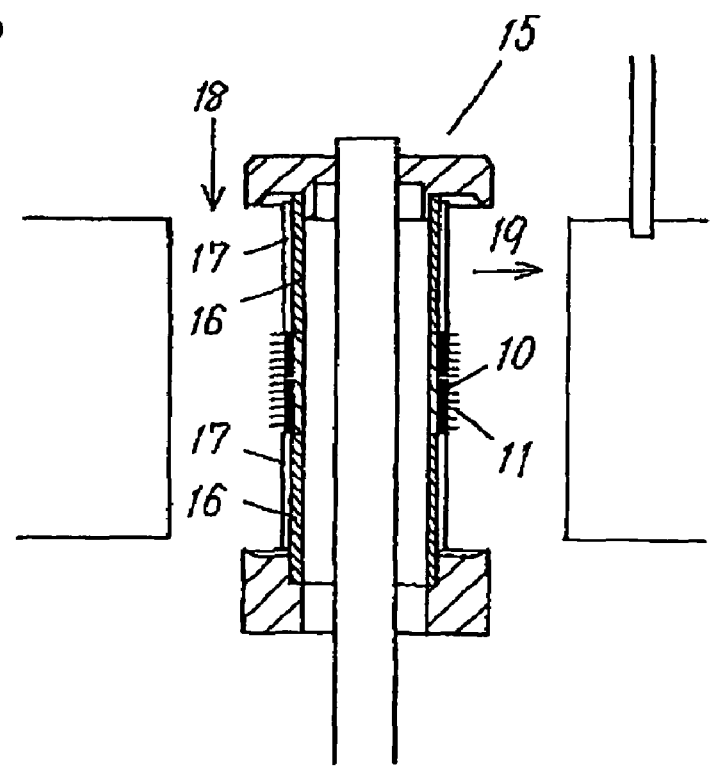
FIG. 2 is a longitudinally sectional view of a magnetron having a cold cathode in which graphite nano-fibers are used for a primary electron emission source and an oxide material film is used for a secondary electron emission source in a second embodiment of the present invention.

FIG. 2 is a longitudinally sectional view showing the structure of main parts of a cold cathode magnetron according to a second embodiment of the present invention. In the second embodiment, graphite nano-fibers are employed as a primary electron emission source and an oxide material film is used as a secondary electron emission source.

According to this embodiment, in a cathode part 15 of the magnetron, barium carbonate is deposited on the outer peripheral surface of a cylindrical cathode substrate 16 by a thermal CVD method. Then, barium carbonate on the outer peripheral surface of the cathode substrate 16 is heated at 800° C. in vacuum and thermally decomposed to barium oxide. Thus, secondary electron emission sources having oxide material films 17 formed are arranged at both ends in the axial direction of a primary electron emission source made of a cylindrical cathode substrate 10 on which graphite nano-fibers 11 are formed. The barium oxide film advantageously has a secondary electron emission ratio as high as 4.8 among the oxide material films. Strontium oxide or calcium oxide may be used.

A split anode is an anode for an existing magnetron (divided into ten, inside diameter of 8 mm). The above-described cathode part was arranged coaxially with the anode to assemble a magnetron vacuum tube. A pair of magnets (not shown in the drawing) were axially disposed. Thus, while a direct current magnetic field 18 was generated for 0.35 T, voltage of −6.0 kV was applied to the cathode part 10. A radial electric field 19 generated due to voltage between the anode and the cathode caused a field emission phenomenon to be generated in the graphite nano-fibers 11 of the cathode part 15 and electrons to be emitted. When the voltage was firstly applied to the cathode part, the thickness of the graphite nano-fibers was not uniform. Accordingly, protruding graphite nano-fibers abnormally discharged. In this case, the protruding parts were eliminated due to the discharge. After the abnormal discharges of several times, emission parts were distributed. Finally, substantially all the surface of the graphite nano-fiber film uniformly emitted the electrons.

The electrons made a cyclotron motion by the axial direct current magnetic field 18 and rushed to the oxide material films 17. Thus, many secondary electrons were emitted, an electric current of 60 mA was maximally supplied between the anode and the cathode and an oscillation of 250 W was maximally obtained under 2.45 GHz.

Third Embodiment

Figure 3:
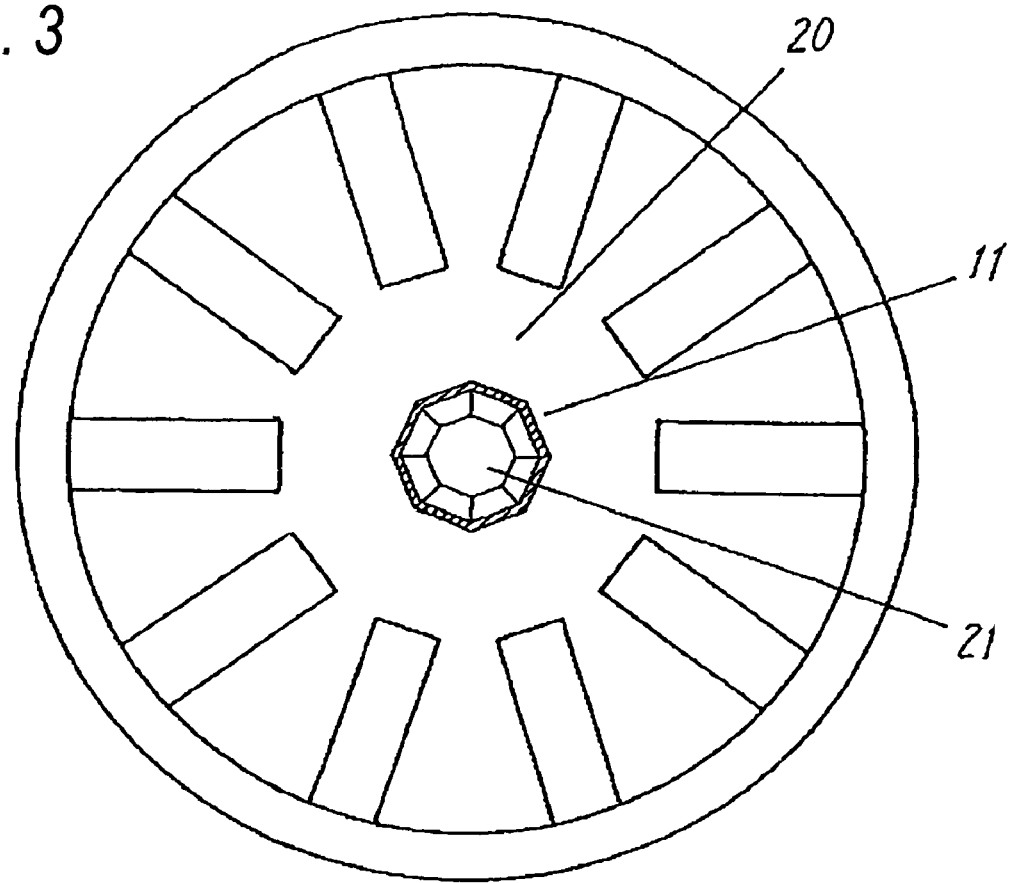
FIG. 3 is an axially vertical sectional view of a magnetron having a cathode in which graphite nano-fibers are allowed to grow on a flat plate and the plurality of the flat plates are arranged so as to have a polygonal post in a third embodiment of the present invention.

FIG. 3 is an axially vertical sectional view showing the structure of main parts of a magnetron according to a third embodiment of the present invention in which graphite nano-fibers are allowed to grow on a plate shaped cathode substrate and a plurality of the cathode substrates are arranged so as to form a polygonal post as a cathode part.

According to this embodiment, the cathode part 20 of the magnetron is formed in such a manner that the graphite nano-fibers 11 are allowed to grow on the plate shaped cathode substrate 21 to combine the cathode substrates into an octagonal post and obtain a cathode part. Since the cathode substrate 21 is plate shaped, the graphite nano-fibers 11 are preferably easily formed on the surface of the cathode substrate 21.

Fourth Embodiment

Figure 4:
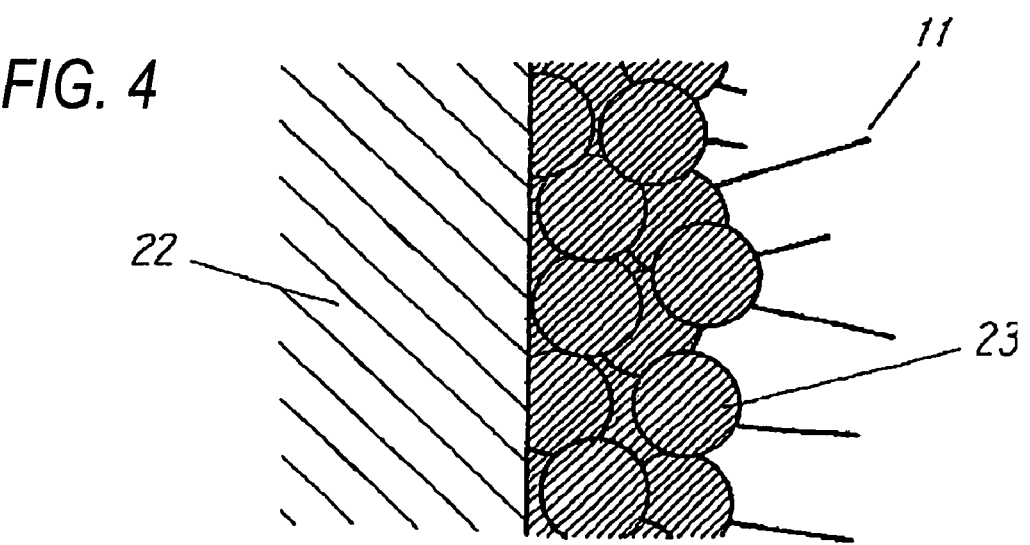
FIG. 4 is an enlarged schematic view of the surface of a cathode having a cold cathode in which powdered graphite nano-fibers and oxide slurry are applied to the surface of the cathode in a fourth embodiment of the present invention.

FIG. 4 is an enlarged schematic view of the cathode surface of a cold cathode formed by applying powdered graphite nano-fibers and oxide slurry on the surface of the cathode in a fourth embodiment of the present invention.

According to this embodiment, in the cathode part of the magnetron, the mixture of slurry obtained by mixing carbonate whose particle diameter is several microns to several ten microns with a binder and powdered graphite nano-fibers is applied to the surface of a cathode substrate 22 and heated to change the carbonate to oxides 23. The graphite nano-fibers 11 are used for an electron emission source for emitting primary electrons. The oxides 23 on the surface of the cathode are used as an electron emission source for emitting secondary electrons. When only the graphite nano-fibers are applied on the cathode substrate, the graphite nano-fibers are laid and fixed onto the cathode substrate. Thus, an electric field does not focus, so that the cathode substrate is not used for a field emission electrode. However, when particulate carbonate is used, the particles of the carbonate support the graphite nano-fibers, so that the graphite nano-fibers can be vertically fixed to the cathode substrate. Thus, in this structure, an electrode film can be easily formed only by applying the mixture to the cathode substrate.

Fifth Embodiment

Figure 5:
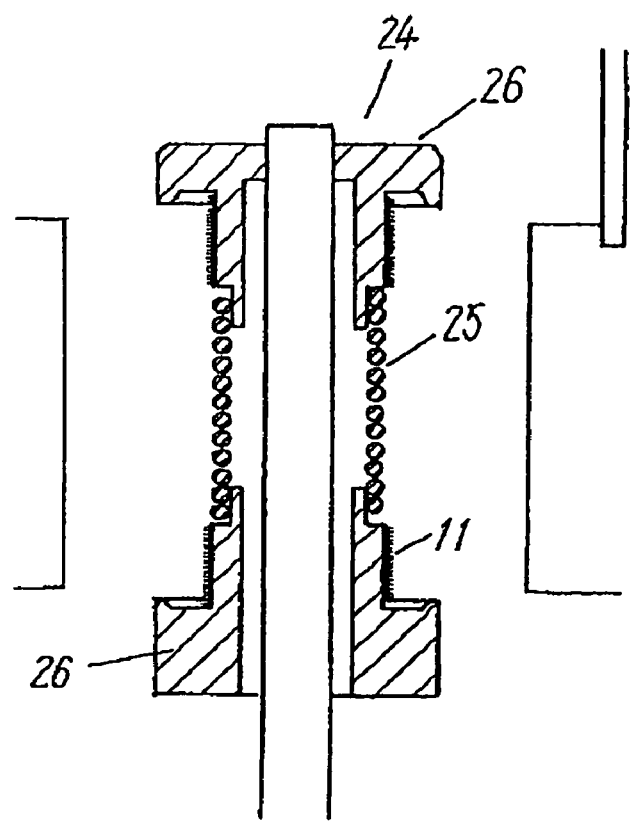
FIG. 5 is a longitudinally sectional view showing the structure of main parts of a magnetron having a cathode using graphite nano-fibers and filaments in a fifth embodiment of the present invention.

FIG. 5 is a longitudinally sectional view showing the structure of main parts of a magnetron according to a fifth embodiment of the present invention in which a cathode using graphite nano-fibers and filaments is provided.

In this embodiment, a cathode part 24 of the magnetron is formed with filaments 25 partly made of thorium tungsten and a part of end hats 26 for holding the filaments 25 between them is formed with the graphite nano-fibers 11. In this structure, the initial operation of the magnetron is carried out by electrons emitted from the graphite nano-fibers 11. After that, when the temperature of the cathode part 24 rises by energy when the electrons rush again into the cathode, thermoelectrons are emitted from the filaments 25. Thus, a larger quantity of electric current can be obtained between an anode and the cathode upon operation of the magnetron.

The present invention can be used for a high frequency heating device such as a microwave range, radar, air-crafts, marine vessels, space-crafts, rockets, etc.

What is claimed is:

1. A magnetron comprising:
   an anode;
   a cathode disposed coaxially with said anode, having an electron emission surface; and
   graphite nano-fibers arranged on the electron emission surface of the cathode,
   wherein the cathode has a polygonal post outer shape or a polygonal tubular outer shape, and only one connecting terminal for applying high-voltage from the cathode.

2. A magnetron according to claim 1, wherein the cathode includes an oxide material film high in its secondary electron gain arranged in a part of the electron emission surface.

3. A magnetron according to claim 2, wherein a mixture of oxide whose particle diameter is several microns to several ten microns and graphite nano-fibers as a powdered material is applied on the surface of a cathode substrate to obtain an electron emission source.

4. A magnetron according to claim 2, wherein a part of an electron emission source is formed with filaments.

5. A magnetron comprising:
   an anode;
   a cathode disposed coaxially with said anode, having an electron emission surface; and
   graphite nano-fibers arranged on the electron emission surface of the cathode,
   wherein the cathode comprises first and second portions, each having the electron emission surface on which the graphite nano-fibers are arranged, and filaments interposed between the first and second portions so that the filaments are substantially in alignment with the first and second portions.

* * * * *